United States Patent [19]

Nelson

[11] 3,725,469
[45] Apr. 3, 1973

[54] PROSTANOIC ACID DERIVATIVES
[75] Inventor: John W. Nelson, Kalamazoo, Mich.
[73] Assignee: The Upjohn Company, Kalamazoo, Mich.
[22] Filed: Mar. 23, 1970
[21] Appl. No.: 22,037

Related U.S. Application Data

[63] Continuation-in-part of Ser. No. 555,236, June 6, 1966, abandoned, which is a continuation-in-part of Ser. No. 480,172, Aug. 16, 1965, abandoned.

[52] U.S. Cl. ........260/514 D, 260/211, 260/247.2 R, 260/268 R, 260/293.65, 260/326.3, 260/429.9, 260/439 R, 260/448 R, 260/501.1, 260/501.15, 260/501.17, 260/501.2, 424/317
[51] Int. Cl. ..............................................C07c 61/36
[58] Field of Search..............................260/514, 468

[56] References Cited

UNITED STATES PATENTS 3,598,858    8/1971    Bergstrom..........................260/468

OTHER PUBLICATIONS

Bergstrom et al. I, J.B.C. 238 3555 (1963)
Bergstrom et al. II, Arkiv For Kemi 20 63(1962)
Daniels et al., Biochemical and Biophysical Research Communications 21, 413 (1965)

Primary Examiner—Lorraine A. Weinberger
Assistant Examiner—Robert Gerstl
Attorney—Earl C. Spaeth and John Kekich

[57] ABSTRACT

This invention is a group of compounds of the formula:

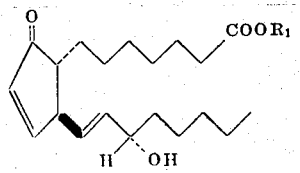

wherein $R_1$ is hydrogen or a pharmacologically acceptable cation, essentially free of pyrogens, antigens, proteins, enzymes, cellular material, and other organic acids or salts thereof. These compounds are useful as vasodepressors and antisecretory agents.

3 Claims, No Drawings

PROSTANOIC ACID DERIVATIVES

CROSS-REFERENCE TO RELATED APPLICATIONS

This application is a continuation-in-part of my copending application Ser. No. 555,236, filed June 6, 1966 now abandoned, which is a continuation-in-part of my copending application Ser. No. 480,172, filed Aug. 16, 1965, and now abandoned.

DESCRIPTION OF INVENTION

This invention relates to novel compositions of matter, and is more specifically concerned with novel organic compounds of the formula:

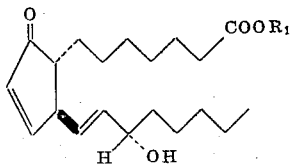

wherein $R_1$ is hydrogen or a pharmacologically acceptable cation.

The compounds of formula I are derivatives of prostanoic acid which has the formula and atom numbering:

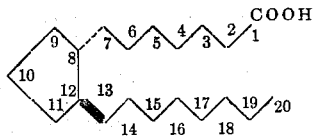

Based on formula II, the compound of formula I wherein $R_1$ is hydrogen has the name 15S-hydroxy-9-oxoprosta-10,trans-13-dienoic acid. Another name for the compound of formula I wherein $R_1$ is hydrogen is prostaglandin $A_1$ or $PGA_1$.

Molecules of the compounds encompassed by formula I each have several centers of asymmetry. Formula I is intended to represent optically active compounds each with the same absolute configuration as optically active prostaglandin $E_1$ ($PGE_1$) obtained from certain mammalian tissues, for example, sheep vesicular glands or human seminal plasma. See, for example, Bergstrom et al., J. Biol. Chem. 238, 3555 (1963), Horton, Experientia, 21, 113 (1965), Bergstrom et al., Pharmacol. Rev. 20, 1 (1968), and references cited in those.

In formulas I and II, a broken line attachment to the cyclopentane ring indicates a chain in alpha configuration, i.e., below the plane of the cyclopentane ring. A heavy solid line attachment to the cyclopentane ring indicates a chain in beta configuration, i.e., above the plane of the cyclopentane ring. The configuration of the side chain hydroxy in formula I is S. See Nature, 212, 38 (1966) for discussion of the stereo-chemistry of the prostaglandins.

$PGA_1$ (formula I, $R_1$=H) and the pharmacologically acceptable salts thereof are useful in mammals, including man and certain useful animals, e.g., dogs and pigs, to reduce and control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 0.1 μg. to about 500 μg. per kg. of body weight per minute, or in a total daily dose by injection or infusion in the range about 0.1 to about 20 mg. per kg. of body weight per day, the exact dose depending on the age, weight, and condition of the patient or animal, and on the frequency and route of administration.

$PGA_1$ (formula I, $R_1$=H) and the pharmacologically acceptable salts thereof exhibit vasodepressor activity in the normotensive state when assayed in dogs prepared according to the technique of Lee et al., Circulation Res. 13, 359 (1963). These dogs are anesthetized, vagotomized, and pentolinium-treated (AVPT dogs). The material to be assayed is administered in ethyl alcohol which is diluted 1 to 10 with physiological saline or 5 percent dextrose for intravenous injection. Because of this activity, $PGA_1$ and its salts are useful in the treatment of hypertension in mammals, including man, useful domestic animals, pets, zoological specimens, and in laboratory animals, for example, rats, rabbits, and dogs. For this purpose, $PGA_1$ or its salts are administered by intravenous infusion, advantageously as a sterile isotonic solution containing 10 to 300 μg. per ml., at the rate about 0.01 to 50 μg. per kg. of body weight per minute, preferably at the rate about 0.1 to 5 μg. per kg. of body weight per minute, or in single or multiple doses of about 25 to 500 μg. per kg. of body weight total per day. The result of this administration is a lowering of blood pressure, an increase in cardiac output, and an increase in sodium excretion.

It is known that other prostanoic acid derivatives lower systemic arterial blood pressure when injected intravenously, especially the prostaglandins known as $PGE_1$, $PGE_2$, and $PGE_3$. See Horton, ibid. However, these other prostaglandins also have a strong stimulatory effect on smooth muscle, for example mammalian intestinal smooth muscle, and antagonize epinephrine-induced mobilization of free fatty acids. It was quite surprising and unexpected, therefore, that the novel formula I $PGA_1$ compounds of this invention have far less smooth muscle stimulatory effect, as shown, for example, by tests on strips of guinea-pig and rabbit smooth intestinal muscle, than, for example, $PGE_1$, and far less antagonism of epinephrine-induced mobilization of free fatty acids than, for example, $PGE_1$. Therefore, $PGA_1$ and its salts are especially useful for the above-described purposes because they are substantially more specific in their action and result in substantially lesser side effects than, for example, $PGE_1$.

$PGA_1$ and its salts are also useful because they can be administered to laboratory animals, preferably rats, to produce animals containing high levels of the compounds. Such animals can then serve as test animals in the search for and study of compounds which are antagonists of the administered compounds and which, for that reason, would be useful in reversing the effects of inadvertent overdoses of these extremely potent compounds, and in the treatment of allergic conditions. For that purpose, $PGA_1$ or one of its salts is advantageously administered to the test animal by continuous intravenous infusion in sterile saline solution at the rate of about 0.01 to about 10, preferably 0.05 to 0.2, micrograms per kilogram of animal weight per minute until the desired level of compound has been reached or until the desired response in the animal has been obtained. Infusion can then be continued or stopped depending on the particular use to be made of the test animal.

For all of the above purposes, $PGA_1$ is used in free acid form or in pharmacologically acceptable salt form.

Pharmacologically acceptable salts of $PGA_1$ useful for the purposes described above are those with pharmacologically acceptable metal cations, ammonium, amine cations, or quaternary ammonium cations.

Especially preferred metal cations are those derived from the alkali metals, e.g., lithium, sodium and potassium, and from the alkaline earth metals, e.g., magnesium and calcium, although cationic forms of other metals, e.g., aluminum, zinc, and iron, are within the scope of this invention.

Pharmacologically acceptable amine cations are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and lower-alkyl derivatives thereof, e.g., 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2-amino-2-ethyl-1,3-propanediol, 2-amino-2-methyl-1-propanol, tris-(hydroxymethyl)aminomethane, N-phenylethanolamine, N-(p-tert-amylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethylammonium, and the like.

As described in greater detail in Example 1, below, $PGA_1$ is obtained by separation from an acidified aqueous reaction mixture obtained by aerobic incubation of all-cis-8,11,14-eicosatrienoic acid with comminuted sheep vesicular glands. The novel formula I compounds of this invention, i.e., $PGA_1$ and its pharmacologically acceptable salts, are, of course, not useful for the above-described pharmacological purposes unless they are essentially free of ingredients and impurities which would materially affect the basic and novel characteristics of these novel compounds. For example, the above-mentioned reaction mixture also contains $PGE_1$ which, as mentioned above, is an extremely potent stimulant of mammalian smooth muscle and antagonist of epinephrine-induced mobilization of free fatty actis. For its intended use, $PGA_1$ must be essentially free of $PGE_1$. The same reaction mixture also contains pyrogens, antigens, proteins, enzymes, cellular material, e.g., gland tissue fragments, and other organic acids, e.g., residual substrate acid, 8,11,14-eicosatrienoic acid. Any of those when injected into animals would cause adverse or undesired effects. Accordingly, the novel formula I acid and salts of this invention are useful for the above-described purposes only when essentially free of pyrogens, antigens, proteins, enzymes, cellular material, and other organic acids or salts thereof. In other words, the novel compounds of this invention must be essentially pure.

Since my invention of the novel formula I compounds, $PGA_1$ has also been made by dehydration of $PGE_1$, and has been obtained from human seminal plasma. See, for example, Pike et al., Proc. Nobel Symposium II, Stockholm (1966); Interscience Publishers, New York, p. 162 (1967), and Hamberg et al., ibid., p. 63.

The novel formula I compound of this invention wherein $R_1$ is hydrogen, i.e., $PGA_1$, is transformed to pharmacologically acceptable salt form, i.e., formula I wherein $R_1$ is a pharmacologically acceptable cation, by neutralization with an appropriate amount of the corresponding inorganic or organic base, examples of which correspond to the cations listed above. These transformations are carried out by a variety of procedures known in the art to be generally useful for the preparation of inorganic, i.e., metal or ammonium, salts, amine acid addition salts, and quaternary ammonium salts. The choice of procedure will depend in part upon the solubility characteristics of the particular salt to be prepared. In the case of the inorganic salts, it is usually suitable to dissolve $PGA_1$ in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of $PGA_1$. Evaporation of the water or addition of a water-miscible solvent of moderate polarity, for example, a lower alkanol or a lower alkanone, gives the solid inorganic salt if that form is desired.

To produce an amine salt, $PGA_1$ is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess is easily removed by evaporation. It is preferred to use stoichiometric amounts of the less volatile amines.

Salts wherein the cation is quaternary ammonium are produced by mixing $PGA_1$ with the stoichiometric amount of the corresponding quaternary ammonium hydroxide in water solution, followed by evaporation of the water.

The invention can be more fully understood by the following examples.

EXAMPLE 1

15S-Hydroxy-9-oxoprosta-10,trans-13-dienoic Acid $(PGA_1)$

Frozen sheep (young buck) seminal vesicles (5 kg.) are ground in a meat grinder. The resulting tissue mass is then homogenized in 500-gram batches in a one-gal- Ion stainless steel Waring blendor for 3 minutes with a total of 5 liters of 0.1 N aqueous ammonium chloride buffer, pH 8.5.

A solution of all-cis-8,11,14-eicosatrienoic acid (5.0 g.) (Korn, J. Biol. Chem. 238, 3584 (1963)) in 50 ml. of ethanol is added slowly to 5 l. of the same 0.1 N aqueous ammonium chloride buffer with vigorous stirring. The resulting emulsion is then mixed with the above total gland homogenate, and the mixture is brought to pH 8.0 by addition of 6 N ammonium hydroxide solution, and then maintained at 37.5° C. for 1 hour with constant stirring to insure aeration.

At the end of the incubation period, the pH of the mixture is brought to 7.5 by addition of 6 N hydrochloric acid. Cold acetone (45 l.) is then added with stirring, and that mixture is allowed to stand 1 hour at about 0° C. Suction filtration gives a first filtrate and a filter cake. The latter is suspended in 4 l. of a mixture of acetone and water, 3:1 by volume, and filtered. The first and second filtrates are combined and extracted twice with 27.5-l. portions of hexane.

The extracted acetone filtrates are then concentrated by evaporation at reduced pressure and below 40° C. to a 4100-ml. volume, and the concentrate is brought to pH 2.8 with hydrochloric acid. The resulting acid solution is extracted successively with two 2-l. portions and two 1-l. portions of dichloromethane. The combined dichloromethane extracts are evaporated under reduced pressure to 2.5 l., and the concentrate is extracted successively with one 2-l. portion and two 1-l. portions of 0.2 M. sodium phosphate buffer, pH 8.0.

The combined buffer extracts are washed with 400 ml. of dichloromethane, and are then brought to pH 2.9 by addition of concentrated hydrochloric acid, and extracted successively with one 1-l. portion and three 500-ml. portions of dichloromethane. The combined dichloromethane extracts are washed successively with 450-ml., 300-ml., and 500-ml. portions of water. The dichloromethane solution is then evaporated under reduced pressure to give 2.84 g. of an oil. That oil is dissolved in 10 ml. of dichloromethane. Crystalline $PGE_1$ gradually separates and is filtered. The filtrate is evaporated, and the oily residue is dissolved in about 3 ml. of dichloromethane. Hexane is then added until the solution is slightly cloudy. Additional $PGE_1$ separates and is filtered.

The above-described dichloromethane-hexane mother liquor is combined with another mother liquor obtained in the same manner, starting with 5 kg. of sheep seminal vesicles and 5.0 g. of all-cis-8,11,14-eicosatrienoic acid. To those two mother liquors is also added an ethyl acetate-hexane mother liquor obtained as follows: the four crops of crystalline $PGE_1$, obtained as described above are combined and dissolved in 10 ml. of dichloromethane; the crystals which separate are filtered and the filtrate is evaporated to dryness; the residue is dissolved in ethyl acetate, and that solution is made cloudy with hexane; the crystals which separate are filtered, giving said ethyl acetate-hexane mother liquor.

Those three combined mother liquors are evaporated, and the residue is dissolved in benzene containing 1 percent ethyl acetate. That solution is added to a 27 × 350 mm. column of acid-washed silica gel. The column is eluted successively with 500 ml. of benzene containing 1 percent ethyl acetate, 2 l. of benzene containing 20 percent ethyl acetate, and 2 l. of benzene containing 40 percent ethyl acetate. The eluate from the 40 percent ethyl acetate in benzene elution is evaporated to dryness to give 0.26 g. of residue.

A portion of the above residue (0.22 g.) is dissolved in hexane and added to a 14 × 360 mm. column of acid-washed silica gel. The column is eluted successively with 500 ml. of hexane, 500 ml. of hexane containing 1 percent ethyl acetate, 500 ml. of hexane containing 5 percent ethyl acetate, 500 ml. of hexane containing 10 percent ethyl acetate, 6,000 ml. of hexane containing 20 percent ethyl acetate, and 12,000 ml. of hexane containing 30 percent ethyl acetate. The column is then eluted with an additional 3,000 ml. of hexane containing 30 percent ethyl acetate, after which the silica gel in the column is removed, slurried with hexane containing 60 percent ethyl acetate, and reformed into the same size column. The resulting column is eluted with 2,000 ml. of hexane containing 60 percent ethyl acetate.

The final 3,000 ml. of 30 percent ethyl acetate in hexane eluate and the 2,000 ml. of 60 percent ethyl acetate in hexane eluate are combined, filtered, and evaporated under reduced pressure to give 0.067 g. of residue. That residue is leached four times with 5-ml. portion of heptane. The heptane-insoluble residue is dissolved in absolute ethanol, filtered, and evaporated to give a residue which is leached successively with 5-ml., 4-ml., and 3-ml. portions of carbon tetrachloride. The carbon tetrachloride solutions are combined and evaporated to give 0.031 g. of residue. That residue is dissolved in about 1 ml. of dichloromethane and spotted on a 20 × 20 cm. thin layer silica gel chromatography plate. The plate is developed in an ethyl acetate-methanol-water solvent system, 8:2:5. The developed plate is air-dried, and the middle section (5 to 9 cm. from spot origin) is scraped from the plate and eluted with dichloromethane. That eluate is evaporated to give 0.026 g. of residue.

The above 26 mg. of residue behaves as a single compound on silica gel thin layer chromatograhy, using ethyl acetate-methanol-water, 8:2:5, or $CHCl_3$-methanol-acetic acid, 90:5:5. The residue is further purified by dissolving in 30 ml. of dichloromethane and extracting the solution with three successive 10-ml. portions of water. The combined yellow water extracts (pH 6.5) are acidified to pH 3.5 with dilute hydrochloric acid, and are then extracted three times with dichloromethane. The combined dichloromethane solutions are dried and evaporated to dryness to give a residue which is dissolved in 15 ml. of warm absolute ethanol. The solution is cooled at −20° C. for about 16 hours. A small amount of residue is separated by filtration and washed on the filter with five 3-ml. portions of absolute ethanol. The filtrate and filtered washings are combined, and evaporated and dried to give 6.6 mg. of essentially pure 15-hydroxy-9-oxoprosta-10,trans-13-dienoic acid ($PGA_1$) in the form of an oil. This substance exhibits about 0.01 of the smooth muscle stimulatory effect of $PGE_1$ and about 0.005 of the antagonism of epinephrine-induced mobilization of free fatty acids shown by $PGE_1$.

I.R. (principal bands; dichloromethane solution) 3,400, 2,640, 1,700, 1,580, 1,180, 970 $cm^{-1}$.

U.V. (ethanol solution) maximum at 220 m$\mu$.

After heating 2.5 ml. of the ethanol solution (39 µg. of acid) with 2.5 ml. of 1 N NaOH in ethanol, the U.V. spectrum maximum is 280 mµ.

Thin Layer Chromatography

A single spot with $R_F$ 0.7 using acetic acid-water, 9:1.
A single spot with $R_F$ 0.75 using chloroform-methanol-acetic acid, 90:5:5.

N.M.R.

The spectrum shows two doublets centered at 6.17 and 7.52 δ; complex multiplet centered at 5–6 δ; two multiplets centered at 4.1 δ and 3.25 δ. Spectrum are taken with a Varian A-60 spectrophotometer on deuterochloroform solution with tetramethylsilane as interval standard.

EXAMPLE 2

Sodium 15S-hydroxy-9-oxoprosta-10,trans-13-dienoate (PGA$_1$ Sodium Salt)

15S-Hydroxy-9-oxoprosta-10,trans-13-dienoic acid (2 mg.) is dissolved in 3 ml. of water-ethanol, 1:1. The solution is cooled to about 10° C. and is neutralized with an equivalent amount of 0.1 N aqueous sodium hydroxide solution. Evaporation to dryness gives sodium 15-hydroxy-9-oxoprosta-10,trans-13-dienoate.

Following the procedure of example 2, but using potassium hydroxide, calcium hydroxide, tetramethylammonium hydroxide, and benzyltrimethyl ammonium hydroxide, each in separate experiments in place of the sodium hydroxide, there are obtained the corresponding salts of PGA$_1$.

I claim:

1. A compound of the formula:

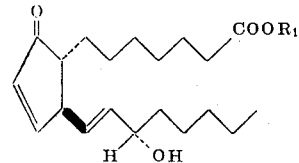

wherein $R_1$ is hydrogen or a pharmacologically acceptable cation, essentially free of pyrogens, antigens, proteins, enzymes, cellular material, and other organic acids or salts thereof.

2. A compound according to claim 1 wherein $R_1$ is hydrogen.

3. A compound according to claim 1 wherein $R_1$ is a pharmacologically acceptable cation.

* * * * *